United States Patent
Lee et al.

(10) Patent No.: US 9,197,319 B2
(45) Date of Patent: Nov. 24, 2015

(54) DEVICE FOR MONITORING OPTICAL LINK FAULT AND METHOD THEREOF

(71) Applicant: Electronics and Telecommunications Research Institute, Daejeon-si (KR)

(72) Inventors: Won-Kyoung Lee, Daejeon-si (KR); Seung-Il Myong, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 140 days.

(21) Appl. No.: 14/054,209

(22) Filed: Oct. 15, 2013

(65) Prior Publication Data

US 2014/0205279 A1 Jul. 24, 2014

(30) Foreign Application Priority Data

Jan. 18, 2013 (KR) .................. 10-2013-0006013

(51) Int. Cl.
*H04B 10/08* (2006.01)
*H04B 10/071* (2013.01)

(52) U.S. Cl.
CPC ................ *H04B 10/071* (2013.01)

(58) Field of Classification Search
CPC ............ H04B 10/071; H04B 10/0771; H04B 10/07955
See application file for complete search history.

(56) References Cited

U.S. PATENT DOCUMENTS

| | | | |
|---|---|---|---|
| 6,674,518 B1* | 1/2004 | Asher et al. ................ | 356/73.1 |
| 2009/0190921 A1* | 7/2009 | Nakajima et al. ............ | 398/13 |
| 2010/0150547 A1* | 6/2010 | Xia et al. ................... | 398/13 |
| 2011/0102776 A1 | 5/2011 | Hasegawa et al. | |
| 2012/0045205 A1 | 2/2012 | Perron | |
| 2012/0236294 A1* | 9/2012 | Smith ......................... | 356/73.1 |

FOREIGN PATENT DOCUMENTS

JP 2010-175502 A 8/2010

OTHER PUBLICATIONS

Hidetoshi Takasugi et al., "A new fault-identification method using a Dichroic reflective optical filter in optical subscriber loops" Journal of Lightwave Technology, vol. 11, Issue 2, pp. 351-357, Feb. 1993.
Wonkyoung Lee et al., "Analysis on Causes of Faults and OTDR Waveforms for Optical Link Management" Published Paper, 2012 International Conference on ICT Convergence (ICTC), pp. 679-684, Oct. 2012.

* cited by examiner

*Primary Examiner* — Dzung Tran
(74) *Attorney, Agent, or Firm* — Rabin & Berdo, P.C.

(57) ABSTRACT

There are provided a device for monitoring an optical link fault and a method thereof. According to an embodiment of the invention, the device for monitoring an optical link fault and the method thereof apply an optical link fault monitoring signal to an optical link and precisely identify a type of the fault using waveforms of a reflected signal returned from the optical link or a wavelength dependence of reflected signal intensity.

13 Claims, 15 Drawing Sheets

Fresnel Reflection
(a)

(b)

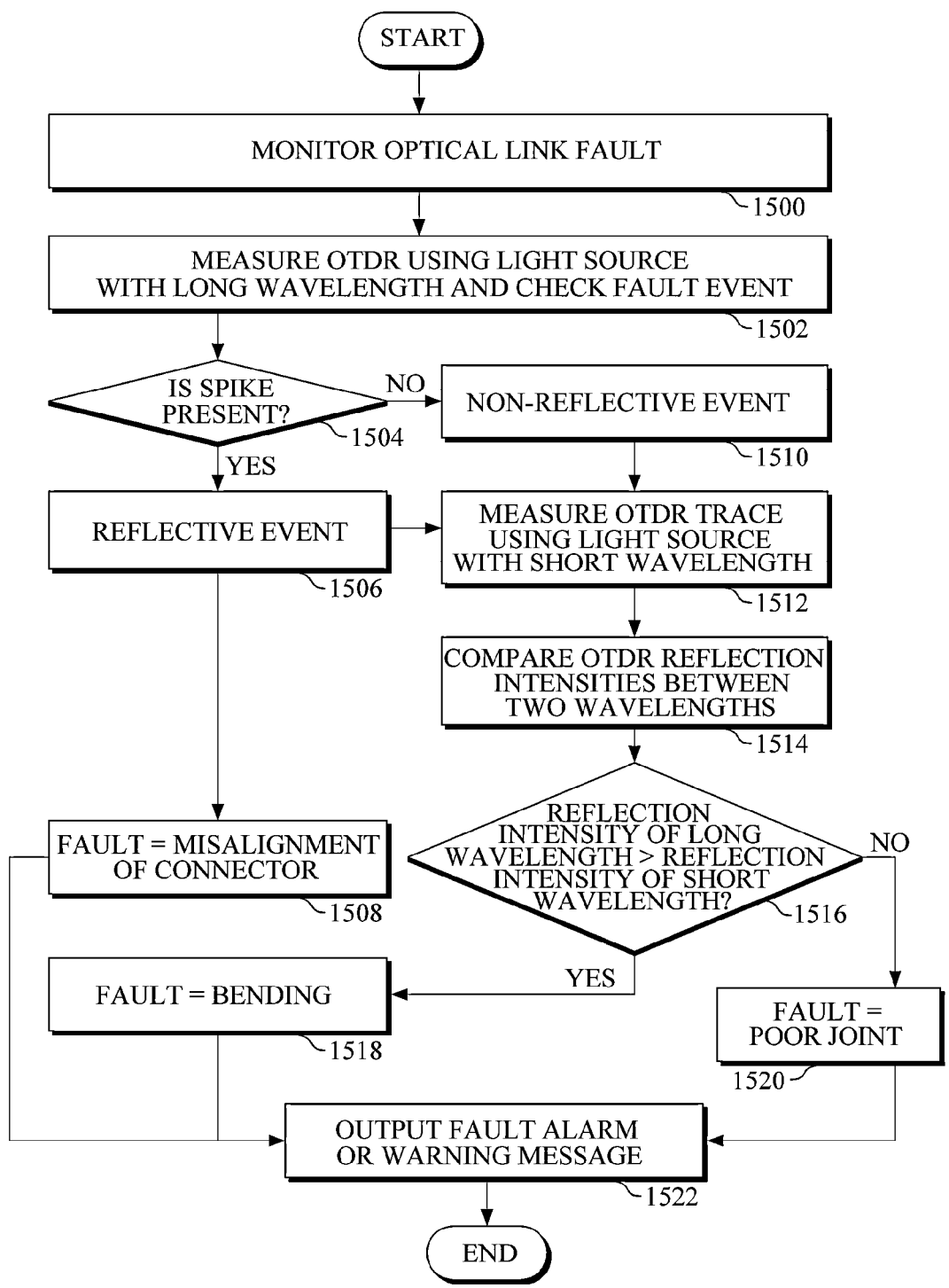

DEVICE FOR MONITORING OPTICAL LINK FAULT AND METHOD THEREOF

CROSS-REFERENCE TO RELATED APPLICATION

This application claims the benefit under 35 U.S.C. §119(a) of Korean Patent Application No. 10-2013-0006013, filed on Jan. 18, 2013, in the Korean Intellectual Property Office, the entire disclosure of which is incorporated herein by reference for all purposes.

BACKGROUND

1. Field

The following description relates to optical link monitoring technology that detects faults of an optical link used as a transmission medium and monitors performance of the optical link.

2. Description of the Related Art

Optical link monitoring technology, which detects faults of an optical link and monitors performance of the optical link, is technology for securing reliability of an optical network. In a long-distance signal transmission, the optical link monitoring technology needs to monitor a distance as long as possible. Since functions of monitoring faults and performance are necessarily required in a subscriber network, in a subscriber network with a point-to-multipoint architecture, research on optical link fault detection in a point-to-multipoint architecture that connects one optical line terminal (hereinafter referred to as 'OLT') and a plurality of optical network units (hereinafter referred to as 'ONU') has been underway.

Research on such methods includes a method of identifying ONUs having a fault using a different monitoring wavelength per ONU with a tunable laser, and a method of identifying ONUs having a fault that slices amplified spontaneous emission (ASE) using an erbium-doped fiber amplifier (EDFA) and a fiber Bragg grating (FBG) and allocates the sliced ASE to each ONU. Recently, a method of monitoring each ONU that assigns a special optical fiber manufactured to have different Brillouin frequency characteristics to each ONU is proposed.

In order to increase reliability of systems or networks and effectively manage optical links, functions of accurately diagnosing and analyzing causes of faults are very important. An optical time domain reflectometer (hereinafter referred to as 'OTDR'), which is a type of optical link fault monitoring devices that measures loss or attenuation characteristics of optical fibers, using backscattered signals and backreflected signals returned when a short pulse is applied to an optical fiber.

Methods of improving performance of the OTDR have been studied in various aspects. As part of such research, there are technologies for improving, for example, resolution or distance accuracy, of a pulse-based OTDR. For example, a coherent OTDR and a code-based OTDR can improve resolution of the OTDR.

The pulse-based OTDR, which measures optical intensity of signals reflected from the is optical fiber by applying optical signals to the optical fiber and schematizes traces with respect to a distance, may identify a fiber cut of the optical fiber, but it is difficult to precisely identify causes of faults due to non-reflective events, for example, a bending or a connector loss. In order to overcome these limitations, methods using a Brillouin OTDR and a dichroic reflective filter are proposed so that it is possible to identify a bending or a connector loss that could not be identified in the OTDR. However, performance of the Brillouin OTDR is unstable since it is easily affected by an environment, for example, temperature or pressure. Moreover, since the method using the dichroic reflective filter requires a specially designed filter, it is expensive and difficult to implement.

SUMMARY

The following description relates to a device for monitoring an optical link fault that can precisely detect a position at which a fault or performance degradation occurs and precisely analyze a cause of the fault and performance degradation and a method thereof.

In one general aspect, there is provided a method of monitoring an optical link fault including applying an optical link fault monitoring signal to an optical link, measuring optical intensity of a reflected signal returned from the optical link, obtaining a trace with respect to a distance, and identifying a type of the optical link fault using the obtained trace and a waveform of the reflected signal.

The identifying of the type of the optical link fault may include checking a fault event on the obtained trace, checking whether a spike is present at a position where the fault event is checked on the trace to determine as a reflective event when the spike is present, or otherwise as a non-reflective event, and measuring a waveform of the reflected signal to determine a fault based on the number of waveforms of the reflected signal, the fault due to a misalignment of a is connector when the number is greater than an initial number thereof, a bending fault of the optical fiber when the number is less than the initial number thereof, or a splicing fault when the number is equal to the initial number thereof.

The identifying of the type of the optical link fault may further include determining the bending fault by changing the refractive index distribution of an optical fiber using a conformal transformation when it is determined as the non-reflective event.

The method of monitoring the optical link fault may further include reporting a result of identifying a type of the optical link fault to the external system.

In another aspect, there is provided a method of monitoring an optical link fault including applying an optical link fault monitoring signal having a different wavelength to an optical link and identifying a type of the optical link fault using a wavelength dependence of optical intensity of a reflected signal returned from the optical link.

The identifying of the type of the optical link fault may include obtaining a trace through a monitoring signal having a first wavelength to check a fault event, checking whether a spike is present at a position where the fault event is checked on the trace to determine as a reflective event when the spike is present, or otherwise as a non-reflective event, obtaining a trace through a monitoring signal having a second wavelength and comparing intensities of reflected signals having the first and second wavelengths to determine a fault based on the intensity, the fault being as a bending fault of the optical fiber when intensity of the reflected signal with the first wavelength is greater than that of the reflected signal with the second wavelength, or a splicing fault when intensity of the reflected signal with the second wavelength is greater than that of the reflected signal with the first wavelength, in which the first wavelength is longer than the second wavelength.

The identifying of the type of the optical link fault may further include determining as a is misalignment of a connector when it is determined as the reflective event.

The method of monitoring the optical link fault may further include reporting a result of identifying a type of the optical link fault to the external system.

In still another aspect, there is provided a device for monitoring an optical link fault including an optical signal generating unit configured to generate an optical link fault monitoring signal and apply the monitoring signal to an optical link, a reflected signal intensity measuring unit configured to measure optical intensity of an reflected signal returning from the optical link and obtain a trace with respect to a distance, a reflected signal waveform measuring unit configured to measure a waveform of the reflected signal, and a fault determining unit configured to identify a type of the optical link fault using the trace obtained by the reflected signal intensity measuring unit and the waveform measured by the reflected signal waveform measuring unit.

Other features and aspects will be apparent from the following detailed description, the drawings, and the claims.

BRIEF DESCRIPTION OF THE DRAWINGS

FIG. 15 is a flowchart illustrating a method of identifying a fault using wavelength dependence characteristics of the reflected signal intensity based on FIGS. 11 to 14 according to the embodiment of the invention.

Figure 1:
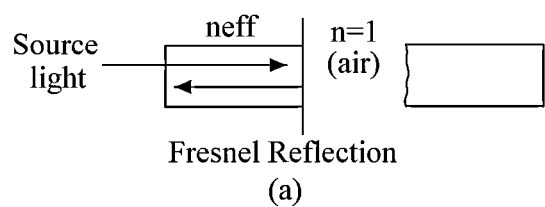
FIG. 1 is a reference diagram illustrating an OTDR trace when a fault due to a fiber cut occurs according to an embodiment of the invention.
Figure 1:
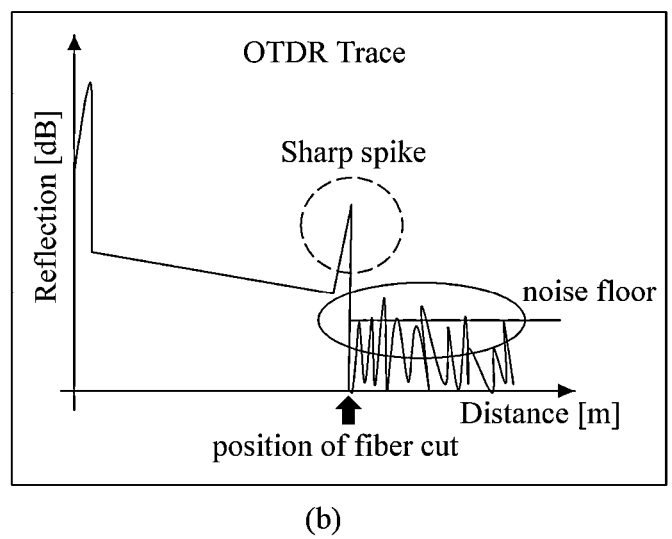

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, exemplary embodiments of the invention will be described in detail with reference to the accompanying drawings. When it is determined that detailed explanations of related well-known functions or configurations unnecessarily obscure gist of the embodiments, the detailed description thereof will not be repeated. The terminology used herein is defined by considering a function in the embodiments, and meanings may vary depending on, for example, a user or operator's intentions or customs. Therefore, the meanings of terms used in the embodiments should be interpreted based on the scope throughout this specification.

A fault of an optical link occurs due to a variety of causes, for example, a fiber cut, a fiber bent, and a connector's misalignment. A device for monitoring a fault of the optical link may be used to detect faults and monitor performance of the optical link. An optical time domain reflectometer (hereinafter referred to as 'OTDR'), which is a type of optical link fault monitoring devices, applies an optical signal for monitoring to the optical link, measures optical intensity of a reflected signal returned from the optical link, and then obtains an OTDR trace with respect to a distance.

In the context of this specification, the expression 'OTDR trace' includes any method of storing processed data or displaying of obtained OTDR signals, and data is proportional to measured optical signals as a function of delay time. In general, using this delay time, when a known correlation using a well-known or assumed index of refraction for optical fibers is applied at each OTDR wavelength, a function of time may be converted to a function of distance subsequently. In this specification, a vertical axis of the OTDR trace represents intensity of the reflected signal returned due to Rayleigh scattering and Fresnel reflection in units of decibel [db], and a horizontal axis represents a distance in units of meter [m]. Hereinafter, characteristics of OTDR traces when a variety of faults occur will be described below with reference to FIGS. 1 to 4.

FIG. 1 is a reference diagram illustrating an OTDR trace when a fault due to a fiber cut occurs according to an embodiment of the invention.

Specifically, FIG. 1A illustrates a reflection mechanism and FIG. 1B illustrates the OTDR trace due to a fiber cut. The fault due to a fiber cut includes whether a fiber is vertically cut or obliquely cut with respect to a traveling direction of a monitoring signal. When the fiber is vertically cut, Fresnel reflection occurs due to a big difference of refractive indexes between air and a core of an optical fiber. As a result, as illustrated in FIG. 1, a sharp spike and a rapid is decrease in optical intensity are observed on the OTDR trace. On the other hand, when the fiber is obliquely cut, since Fresnel reflection occurs in a vertical direction with respect to an tilted fiber cut surface and is not received by an OTDR receiver, only a rapid decrease in optical intensity without a sharp spike is observed on the OTDR trace.

Figure 2:
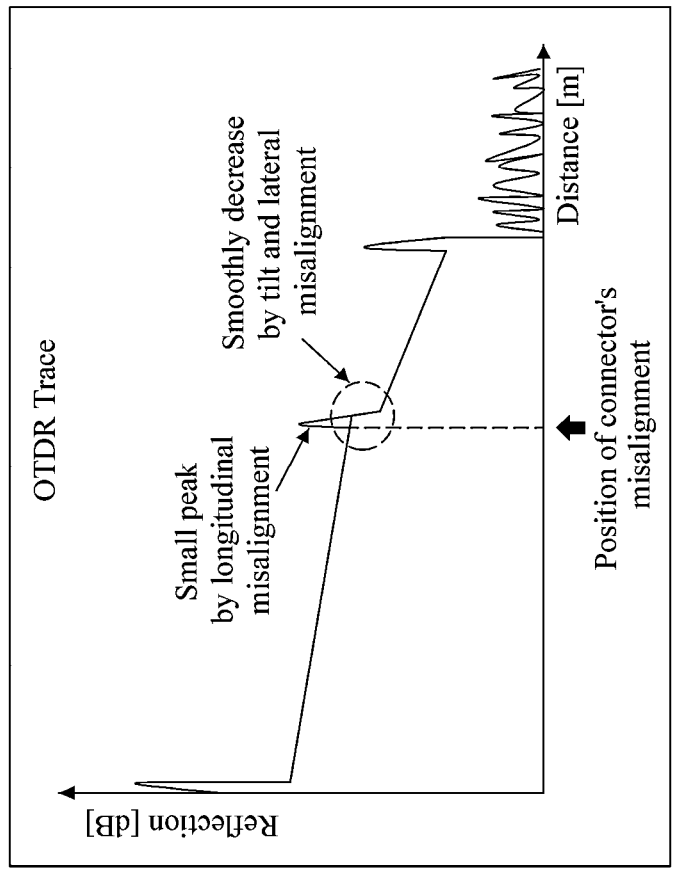
FIG. 2 is a reference diagram illustrating an OTDR trace when a fault due to a connector's misalignment occurs according to the embodiment of the invention.
Figure 2:
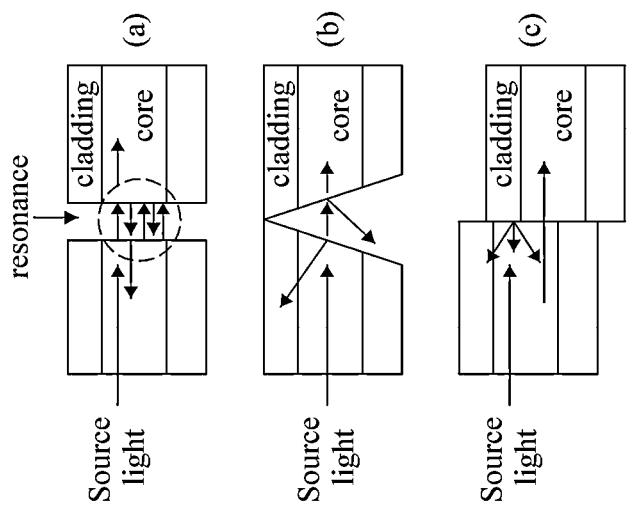

FIG. 2 is a reference diagram illustrating an OTDR trace when a fault due to a connector's misalignment occurs according to the embodiment of the invention.

A connector is generally made of a ceramic ferrule and includes a mechanical tolerance. As illustrated in FIG. 2, there are a variety of connector's misalignments, for example, (a) a longitudinal misalignment, (b) a tilted misalignment, and (c) a lateral misalignment. When there is a connector's misalignment, due to a small refractive index difference between a core and a cladding of the optical fiber, Fresnel reflection does not occur but only Rayleigh scattering occurs. As a result, only a portion of smoothly decreasing optical intensity is observed on the OTDR trace.

As illustrated in FIG. 2, at a position where a connector's misalignment occurs, a small peak is observed on the OTDR trace in a case of (a) a longitudinal misalignment, and smoothly decreasing optical intensity is observed in cases of (b) a tilted misalignment and (c) a lateral misalignment.

Figure 3:
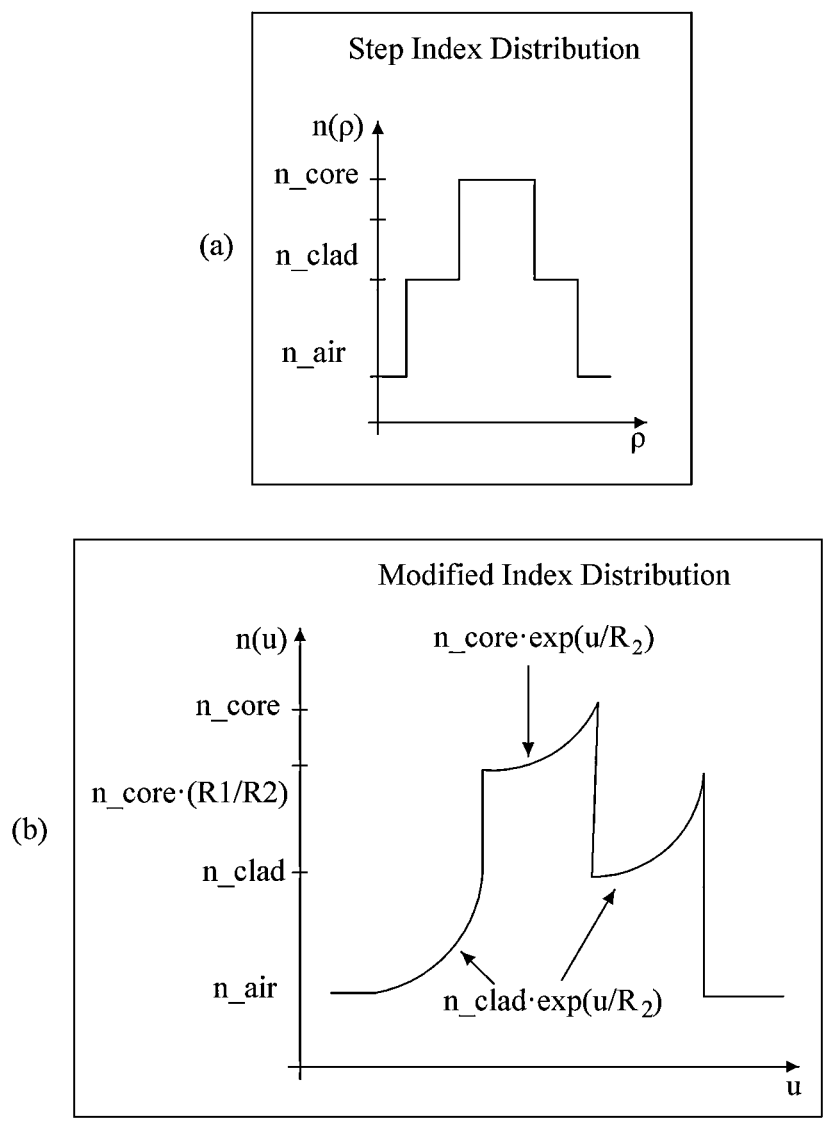
FIG. 3 is a reference diagram illustrating a difference of refractive index distributions between a straight fiber and a bent fiber according to the embodiment of the invention.

FIG. 3 is a reference diagram illustrating a difference of refractive index distributions between a straight fiber and a bent fiber according to the embodiment of the invention.

When the optical fiber is bent, Rayleigh scattering occurs since some energy of the optical signal is out of a critical angle. Similarly to the fault due to a connector's misalignment, in the fault due to a bending, only a portion of smoothly decreasing optical intensity of the reflected signal is observed on the OTDR trace.

Monitoring technology using the reflected signal intensity based OTDR trace can identify is a fault due to a fiber cut, but it is difficult to identify a fault due to a non-reflective event, for example, a connector or a bending. This is because the non-reflective event, for example, a connector or a bending, shows the same pattern on the OTDR trace. Therefore, in order to distinguish faults due to a connector and a bending, the invention uses change characteristics of the refractive index of the optical fiber due to a connector and a bending. In this case, it is possible to calculate a refractive index distribution of the bent fiber using a conformal transformation method. As illustrated in FIG. 3, an optical fiber having a (a) staircase-shaped refractive index distribution (step index distribution) is changed to have a (b) asymmetrically warped refractive index distribution (modified index distribution) due to a bending.

Figure 4:
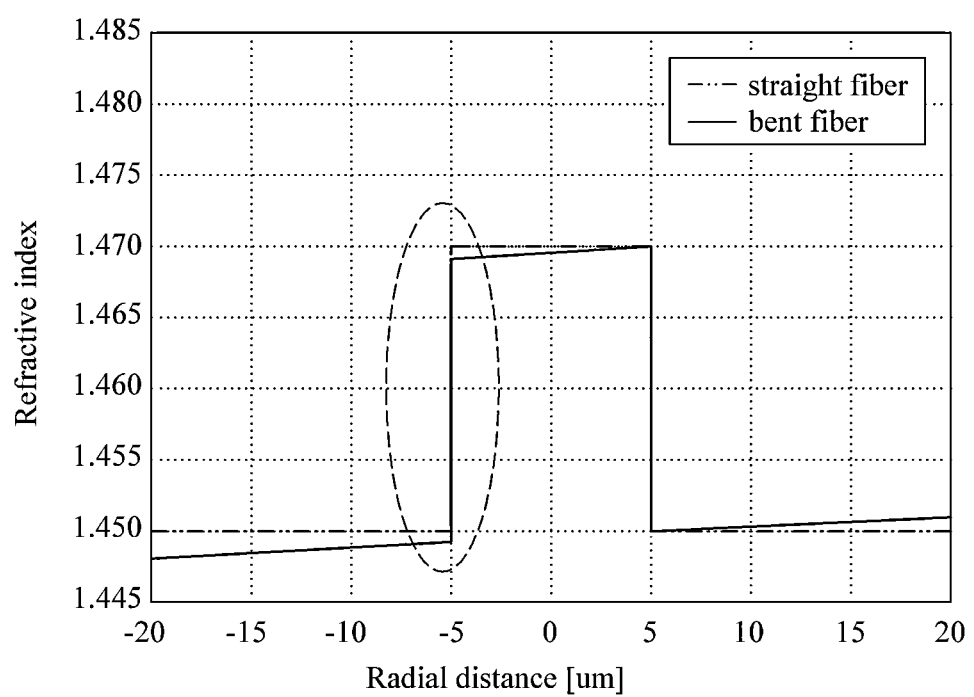
FIG. 4 is a reference diagram illustrating a refractive index distribution of an optical fiber bent in a cross section of the optical fiber according to the embodiment of the invention.

FIG. 4 is a reference diagram illustrating a refractive index distribution of an optical fiber bent in a cross section of the optical fiber according to the embodiment of the invention.

Specifically, FIG. 4 illustrates a simulation result when a bending having a radius of 2 cm is applied to an optical fiber having a core diameter of 10 μm, a core refractive index of 1.467, and a cladding refractive index of 1.457. In this case, as illustrated in FIG. 4, the refractive index is tilt to one side due to a bending of the optical fiber. Accordingly, when a bending due to some pressure occurs in the optical fiber, the optical signal is transmitted in a state in which the refractive index of the optical fiber is modified from at a position where a bending occurs.

On the other hand, in a connector's misalignment, since waveguide for transmitting the optical signal is not distorted, the optical fiber refractive index distribution does not change but only a coupling loss occurs due to a misalignment between two optical fibers. Therefore, the invention provides a method of identifying a fault, for example, a bending, a splicing loss, and a connector's misalignment state, using the refractive index distribution characteristics.

Figure 5:
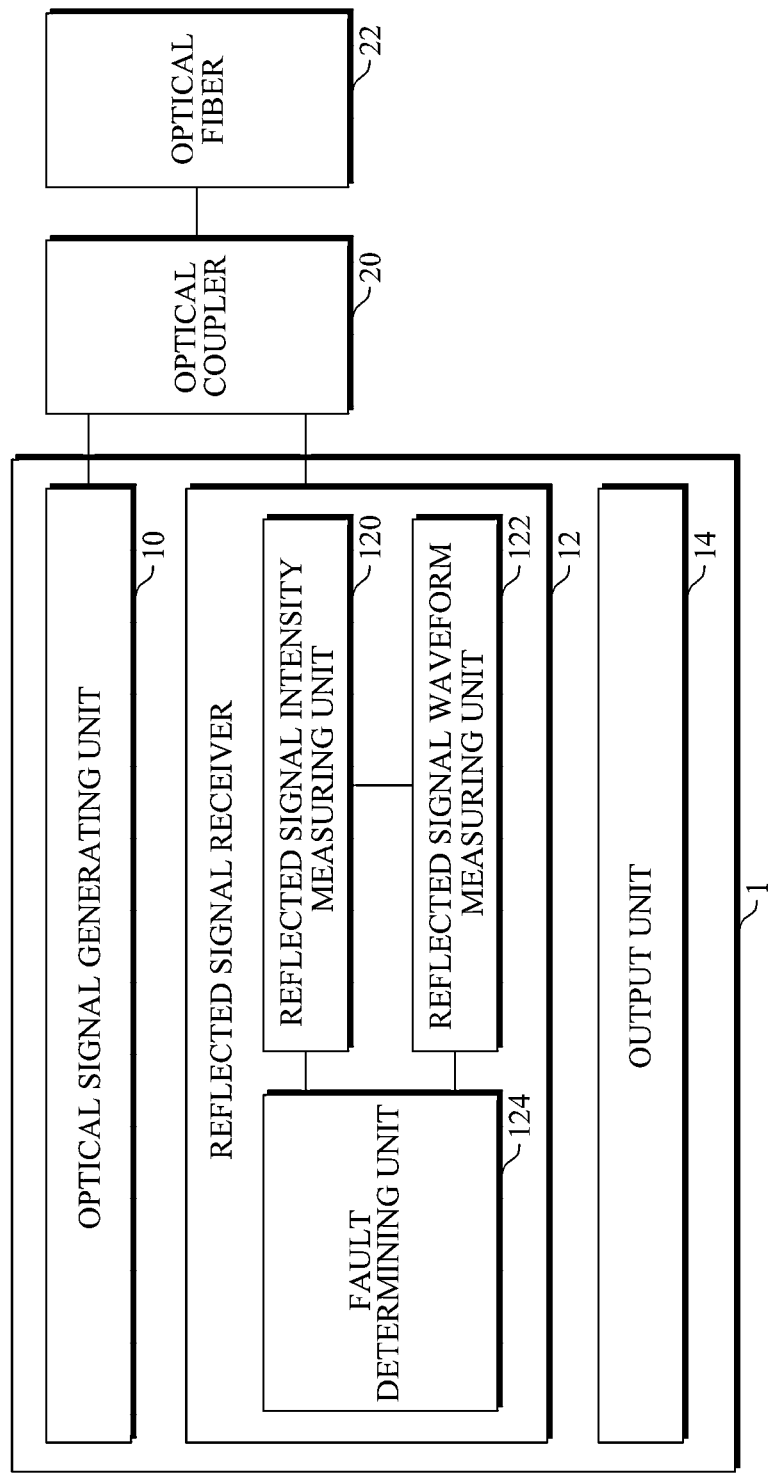
FIG. 5 is a diagram illustrating a configuration of an OTDR device that identifies a fault using waveforms of a reflected signal according to the embodiment of the invention.

FIG. 5 is a diagram illustrating a configuration of an OTDR 1 that identifies a fault using waveforms of the reflected signal according to the embodiment of the invention.

As illustrated in FIG. 5, the OTDR 1 includes an optical signal generating unit 10, a reflected signal receiver 12, or may further include an output unit 14.

The optical signal generating unit 10 is connected to an optical coupler 20 to distinguish the reflected signal and transmitted signal. The optical signal generated in the optical signal generating unit 10 is applied to an optical fiber 22 through the optical coupler 20. The optical signal applied to the optical fiber 22 is reflected or scattered in the optical fiber 22 and then returns to the reflected signal receiver 12 through the optical coupler 20.

Intensity of the optical signal applied to the optical fiber 22 decreases while passing through the optical fiber 22 due to absorption and Rayleigh scattering. In addition, due to Fresnel reflection, intensity of the optical signal decreases in a portion having an appearance change of the optical fiber, for example, a splicing, a misalignment of a connector, and a bending. That is, since Fresnel reflection occurs in a direction opposite to an incident direction at a position where the optical fiber refractive index is radically changed or cut off, the intensity of the optical signal decreases. The reflected signal receiver 12 of the OTDR 1 measures the optical signal returned to an input direction due to Rayleigh scattering and Fresnel reflection and monitors a state of the optical fiber, for example, a bending and a fiber cut.

Specifically, the reflected signal receiver 12 may include a reflected signal intensity measuring unit 120, a reflected signal waveform measuring unit 122, and a fault determining unit 124.

The reflected signal intensity measuring unit 120 measures optical intensity of the reflected signal returning from the optical fiber 22 and obtains an OTDR trace. The reflected signal waveform measuring unit 122 measures a waveform of the reflected signal. The fault determining unit 124 identifies a type of the optical link fault using the trace obtained by the is reflected signal intensity measuring unit 120 and the waveform measured by the reflected signal waveform measuring unit 122.

Specifically, the fault determining unit 124 checks a fault event on the trace obtained by the reflected signal intensity measuring unit 120, and checks whether a spike is present at a position where the fault event is checked to determine as the reflective event when the spike is present, or otherwise as the non-reflective event.

Next, the fault determining unit 124 identifies a fault using a more specific fault identification algorithm. According to the embodiment, the fault determining unit 124 identifies a type of the fault using the number of waveforms of the reflected signal measured by the reflected signal waveform measuring unit 122. Specifically, based on the number of waveforms of the reflected signal, the fault is determined as a misalignment of a connector when the number is greater than an initial number thereof, a bending fault of the optical fiber when the number is less than the initial number thereof, or a splicing fault when the number is equal to the initial number thereof. A detailed fault determining algorithm will be described below with reference to FIG. 10.

According to another embodiment, the fault determining unit 124 compares intensity of the reflected signal with a long wavelength (for example, 1625 nm) and intensity of the reflected signal with a short wavelength (for example, 1310 nm), and specifically determines a type of the fault. That is, the fault may be determined as a bending fault of the optical fiber when intensity of the reflected signal with a long wavelength is greater than that of the reflected signal with a short wavelength, or a splicing fault when intensity of the reflected signal with a short wavelength is greater than that of the reflected signal with a long wavelength. A detailed fault determining algorithm will be described below with reference to FIG. 15.

The output unit 14 reports an identification result of a type of the optical link fault to the is external system. For example, a fault alarm or warning message may be reported to the external system.

Figure 6:
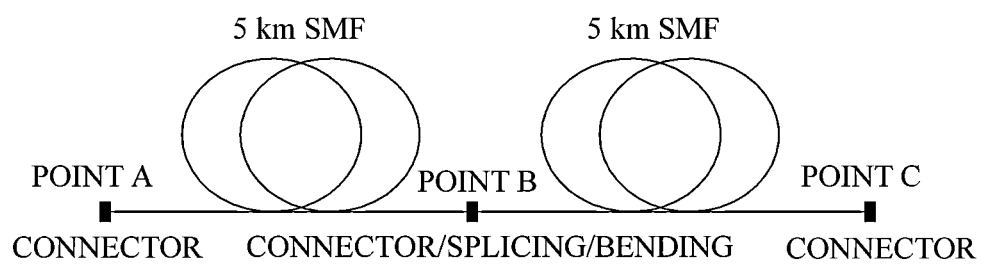
FIG. 6 is a reference diagram illustrating an example of an optical link configuration for identifying a fault using an OTDR trace and waveforms of the reflected signal according to the embodiment of the invention.

FIG. 6 is a reference diagram illustrating an example of an optical link configuration for identifying a fault using an OTDR trace and waveforms of the reflected signal according to the embodiment of the invention.

As illustrated in FIG. 6, it is assumed that two optical fibers each having a length of 5 km are connected with a connector and then an OTDR trace and waveforms of the reflected signal are measured. In this case, the optical connectors are positioned at points A, B, and C. At point B, the optical connector may be replaced by a slicing. The assumption in FIG. 6 is applied to examples in FIGS. 7 to 9 described below, but it is just an example to facilitate understanding and the invention is not limited thereto.

Figure 7:
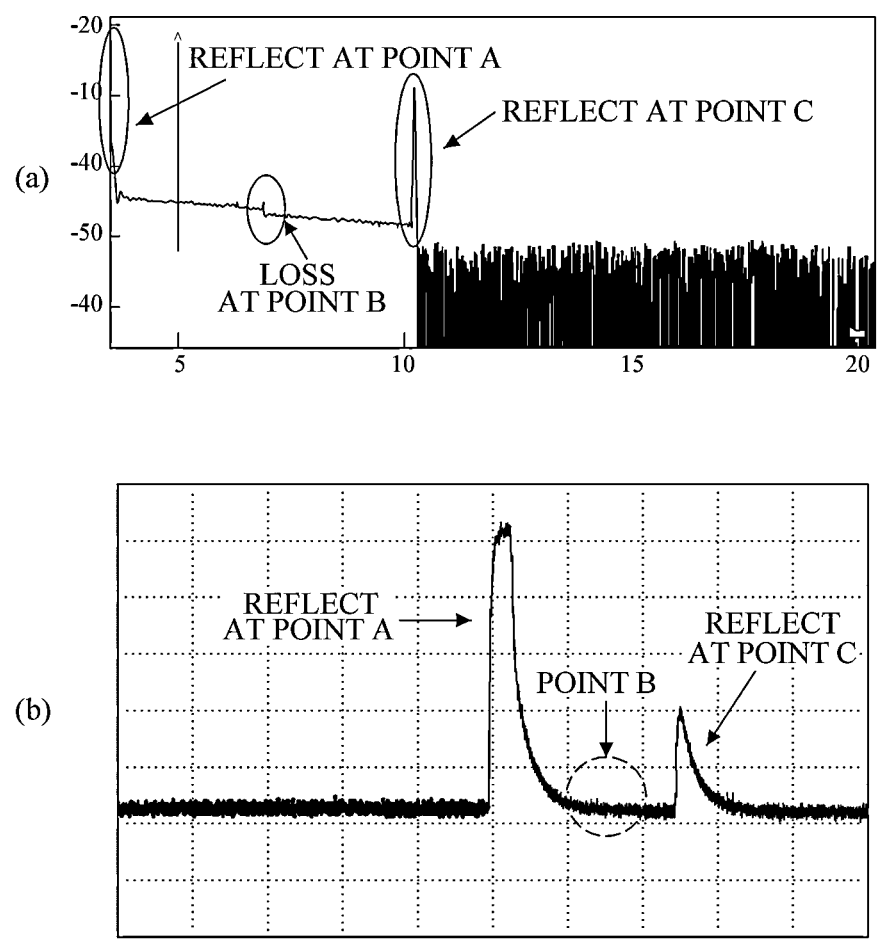
FIG. 7 is a reference diagram illustrating (a) an OTDR trace and (b) waveforms of the reflected signal measured when a splicing loss event is checked according to the embodiment of the invention.

FIG. 7 is a reference diagram illustrating (a) an OTDR trace and (b) waveforms of the reflected signal measured when a splicing loss event is checked according to the embodiment of the invention.

As illustrated in FIGS. 6 and 7, since reflections do not occur in the splicing loss event, for example, a splicing, a reflected signal for point B positioned between points A and C is not present. Specifically, only two waveforms of Fresnel reflected signals generated in two connectors positioned at the end of the optical link where significant reflections occur are measured. Therefore, when the number of waveforms of the reflected signal is equal to an initial number thereof, a cause of the fault may be checked as a splicing fault.

Figure 8:
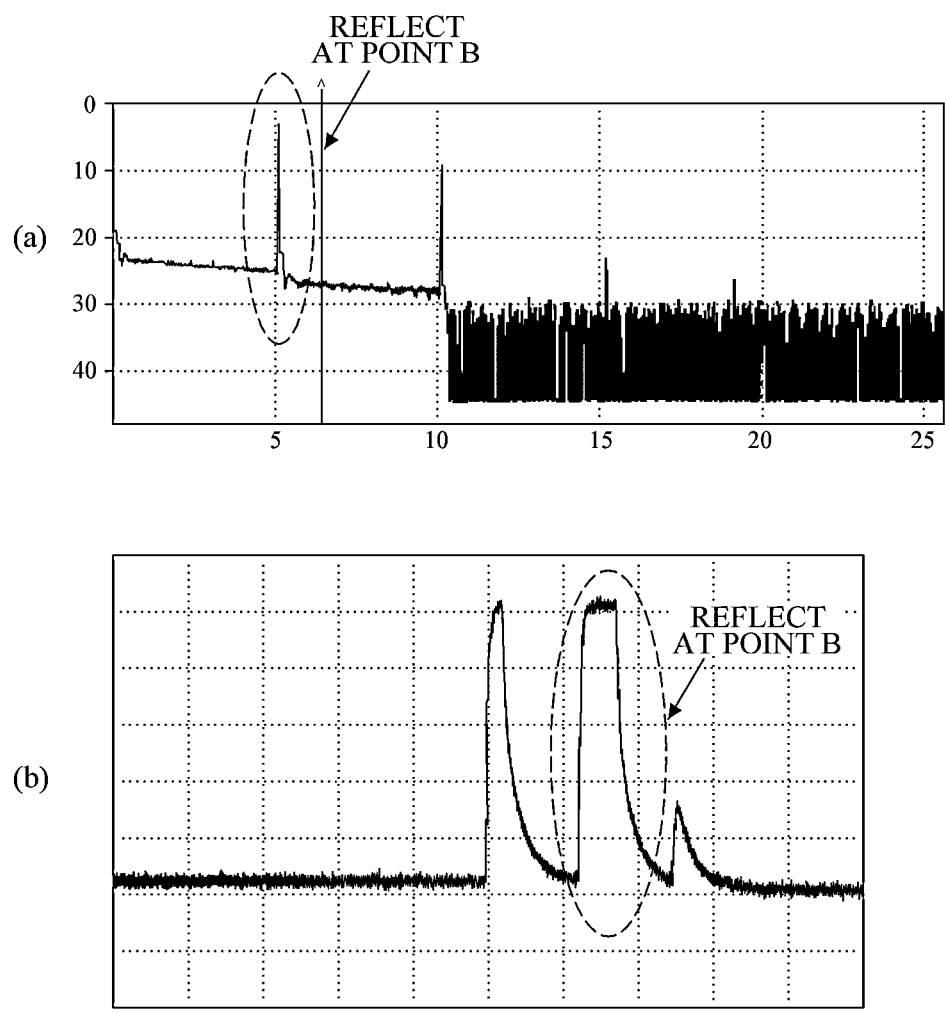
FIG. 8 is a reference diagram illustrating (a) an OTDR trace and (b) waveforms of the reflected signal measured when a connector's misalignment event is checked according to the embodiment of the invention.

FIG. 8 is a reference diagram illustrating (a) an OTDR trace and (b) waveforms of the reflected signal measured when a connector's misalignment event is checked according to the embodiment of the invention.

As illustrated in FIGS. 6 and 8, when the connector at point B is misaligned (connector's misalignment), reflections occur at point B, and thereby waveforms of the reflected signal are added as illustrated in FIG. 8. Accordingly, when the number of waveforms of the reflected signal is greater than an initial number thereof, a cause of the fault may be checked as a misalignment of a connector.

In case of a connector's misalignment or a splicing loss, the reflected signal occurs or disappears only at a position where a corresponding event occurs and waveforms of the reflected signal at different position are not affected. A misalignment of a connector or a fault in a joint is not because of a fault due to a refractive index change of the optical fiber itself but because of a fault due to a mismatching of a center between two optical fibers. Therefore, when waveforms of the reflected signal are measured, localized changes of waveforms occur.

Figure 9:
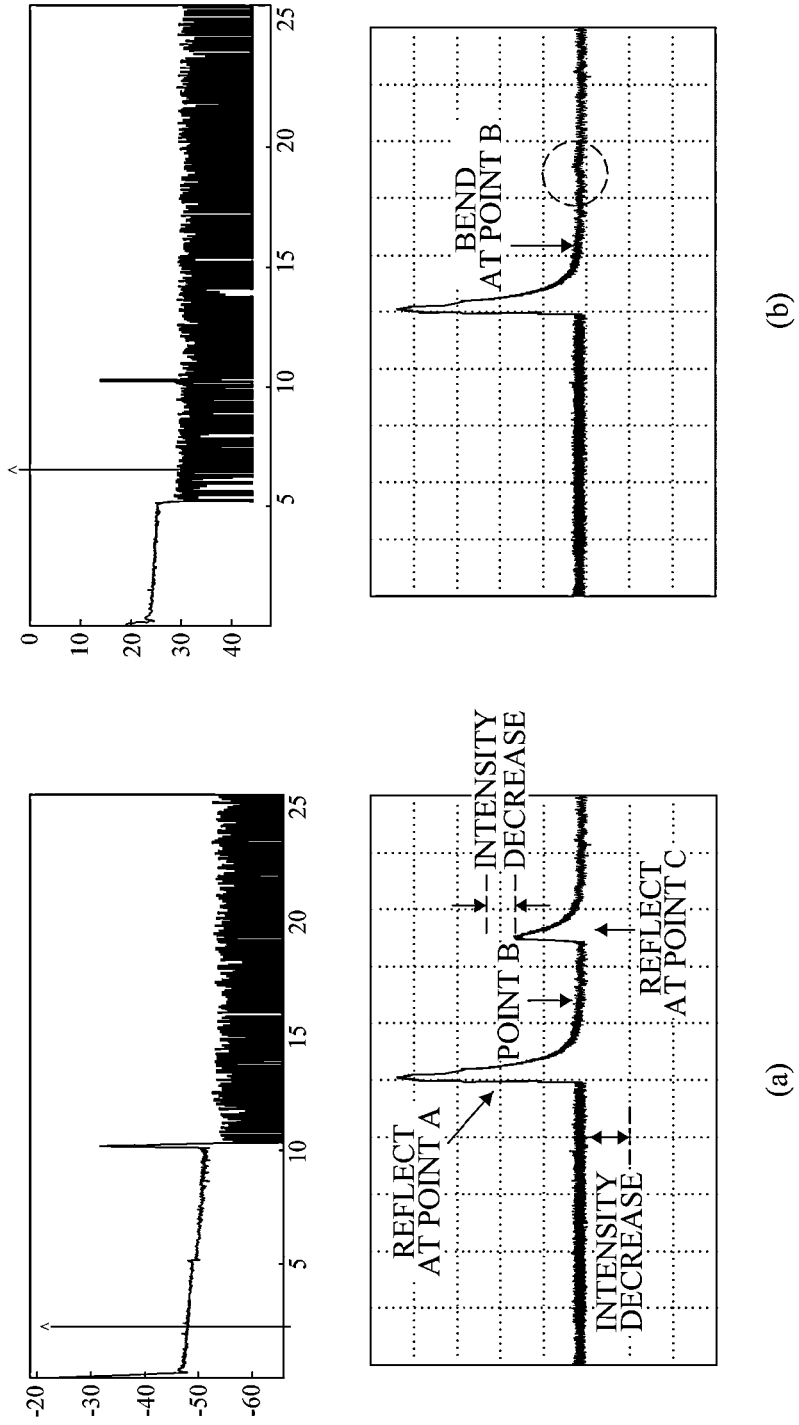
FIG. 9 is a reference diagram illustrating (a) an OTDR trace and (b) waveforms of the reflected signal measured when a bending event is checked according to the embodiment of the invention.

FIG. 9 is a reference diagram illustrating (a) an OTDR trace and (b) waveforms of the reflected signal measured when a bending event is checked according to the embodiment of the invention.

Specifically, FIG. 9 respectively illustrates an OTDR trace and waveforms of the reflected signal of (a) an optical fiber having a bending radius of a diameter 4 cm and (b) an optical fiber having a bending radius of a diameter 2 cm.

In a bending event unlike a connector or joint event, since the refractive index of the optical fiber itself changes, general changes of waveforms of the reflected signal occur. That is, since the refractive index of the optical fiber is modified from point B where a bending occurs, subsequent reflections decrease. Therefore, when the number of waveforms of the reflected signal is less than an initial number thereof, a cause of the fault may be checked as a bending fault.

Figure 10:
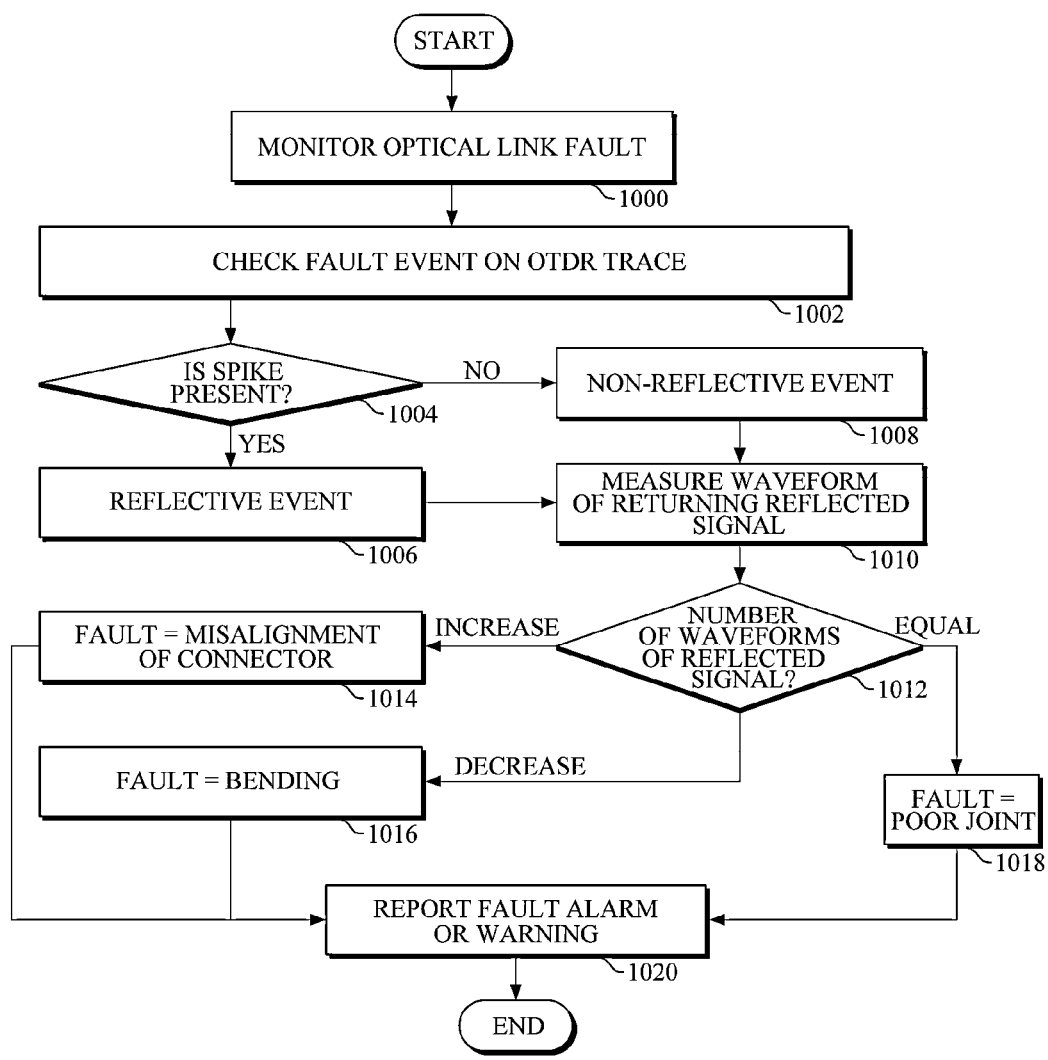
FIG. 10 is a flowchart illustrating a method of identifying a fault using waveforms of the reflected signal based on FIGS. 6 to 9 according to the embodiment of the invention.

FIG. 10 is a flowchart illustrating a method of identifying a fault using waveforms of the reflected signal based on FIGS. 6 to 9 according to the embodiment of the invention.

As illustrated in FIG. 10, while a state of the optical link is monitored using the OTDR in 1000, when an event corresponding to a fault is checked on the OTDR trace in 1002, a fault identification algorithm is executed in order to analyze a cause of the checked fault event. At this time, it is determined whether a spike is present at a position where the event occurs on the OTDR trace in 1004, and it is identified as a reflective event when the spike is present in 1006, or otherwise as a non-reflective event in 1008.

Subsequently, waveforms of the reflected signal are measured to precisely analyze in 1010, and the number of waveforms of the reflected signal is mutually compared with the number of waveforms of an initial reflected signal in 1012. As a comparison result, the fault is determined as a misalignment of a connector when the number of waveforms of the reflected signal is greater than the initial number thereof in 1014, a bending fault when the number of waveforms of the reflected signal is less than the initial number thereof in 1016, or a splicing fault when the number of waveforms of the reflected signal is equal to the initial number thereof in 1018. After a cause of the fault is identified, a fault alarm or warning message may be reported to the external system in 1020.

Meanwhile, with reference to FIGS. 11 to 15, fault identification technology using a wavelength dependence of reflected signal intensity according to another embodiment of the invention will be described below in detail.

Figure 11:
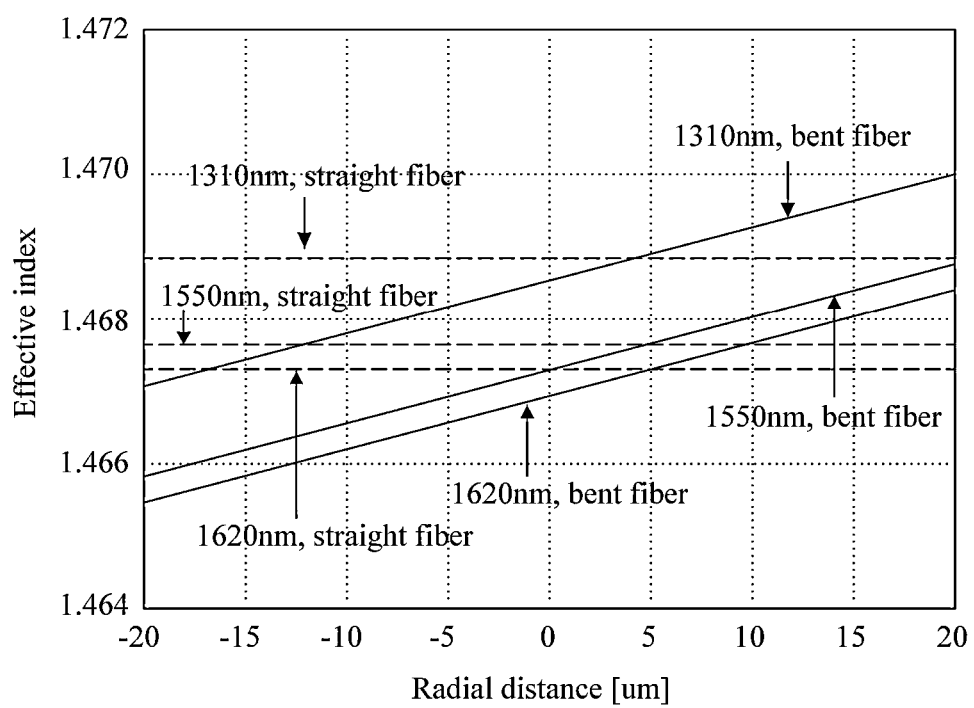
FIG. 11 is a reference diagram illustrating a wavelength dependence of a refractive index in a bent fiber according to the embodiment of the invention.

FIG. 11 is a reference diagram illustrating a wavelength dependence of the refractive index in the bent fiber according to the embodiment of the invention.

As illustrated in FIG. 11, characteristics of the wavelength dependence of the refractive index in the bent fiber are the same as in the straight fiber. That is, in a short wavelength of 1310 nm, the bent fiber and the straight fiber have the highest refractive index, and in a long wavelength of 1620 nm, the bent fiber and the straight fiber have the lowest refractive index. Therefore, in the bent fiber, since a loss is smaller in a short wavelength than in a long wavelength, optical intensity of the reflected signal with a long wavelength is higher than that of the reflected signal with a short wavelength.

Figure 12:
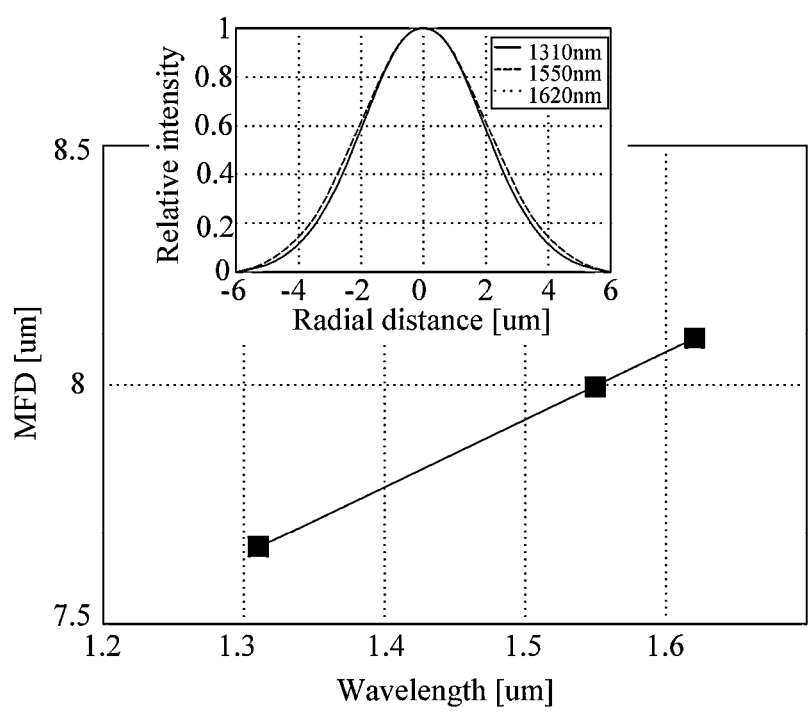
FIG. 12 is a reference diagram illustrating a wavelength dependence of a mode field diameter when a joint event due to a connector or a splicing occurs according to the embodiment of the invention.

FIG. 12 is a reference diagram illustrating a wavelength dependence of a mode field diameter when a joint event due to a connector or a splicing occurs according to the embodiment of the invention.

As illustrated in FIG. 12, at a joint with a connector or a splicing, a loss occurs due to coupling efficiency of two optical fibers, and the coupling efficiency is determined by a mode field diameter (MFD) of signals traveling into the optical fiber. The mode field diameter is a diameter of an optical waveform (beam) that notifies a relative size of the optical signal propagating into the optical fiber. A MFD of a short wavelength is smaller than a MFD of a long wavelength. For example, as illustrated in FIG. 12, the MFD of a short wavelength of 1310 nm has the smallest value and the MFD of a long wavelength of 1620 nm has the greatest value. Therefore, when the optical fiber is connected with a connector or a joint, optical intensity of the reflected signal with a short wavelength having a smaller MFD is more confined than that of the reflected signal with a long wavelength having a greater MFD.

Figure 13:
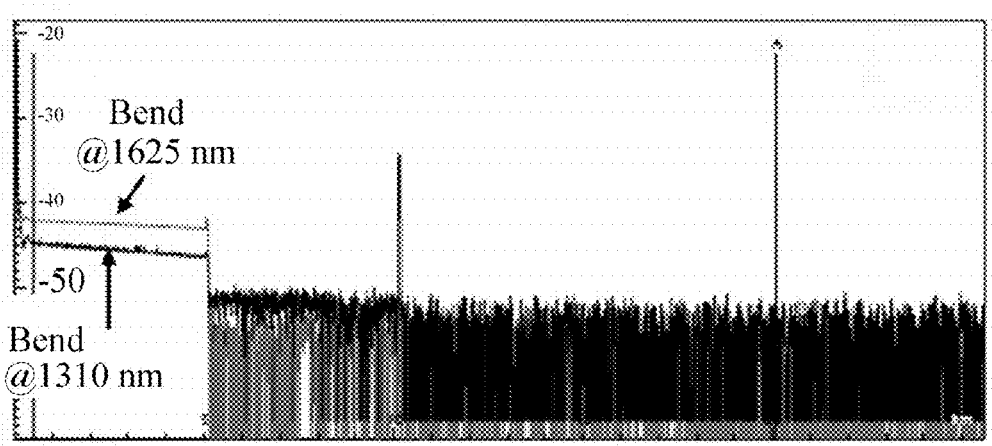
FIG. 13 is a reference diagram illustrating a wavelength dependence of the reflected is signal intensity in a bending event according to the embodiment of the invention.
Figure 14:
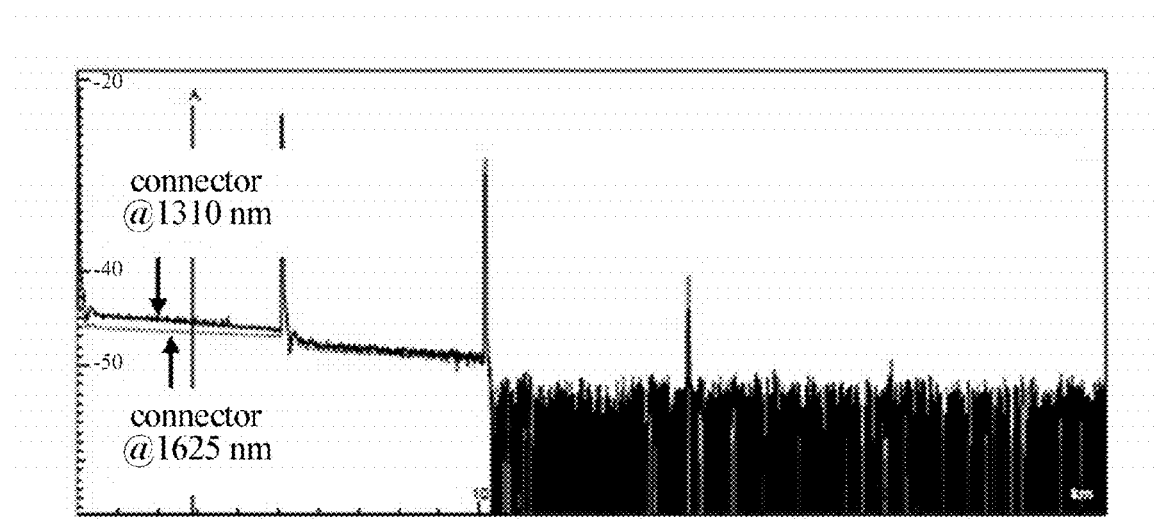
FIG. 14 is a reference diagram illustrating a wavelength dependence of the reflected signal intensity in a connector loss event according to the embodiment of the invention.

FIG. 13 is a reference diagram illustrating a wavelength dependence of the reflected signal intensity in a bending event according to the embodiment of the invention. FIG. 14 is a reference diagram illustrating a wavelength dependence of the reflected signal intensity in a connector loss event according to the embodiment of the invention.

As illustrated in FIGS. 13 and 14, when the event due to a bending or a connector occurs, intensity of the reflected signal with a long wavelength of 1625 nm is greater than that of the is reflected signal with a short wavelength of 1310 nm in the bending event, but intensity of the reflected signal with a short wavelength of 1310 nm is greater than that of the reflected signal with a long wavelength of 1625 nm in the connector event. Therefore, the invention identifies a fault using a different wavelength dependence of reflected signal intensity according to a type of the fault.

FIG. 15 is a flowchart describing a method of identifying a fault using wavelength dependence characteristics of the reflected signal intensity based on FIGS. 11 to 14 according to the embodiment of the invention.

As illustrated in FIG. 15, while a light source with a long wavelength (for example, 1625 nm) is applied to the optical link using the OTDR, an OTDR trace is measured and a state of the optical link is monitored in 1500, and when the event corresponding to a fault is checked in 1502, a specific fault identification algorithm is executed to analyze a cause of the checked fault.

It is determined whether a spike is present at a position where the event occurs on the OTDR trace in 1504. When the spike is present, it is identified as a reflective event in 1506, or otherwise as a non-reflective event in 1510. When it is identified as the reflective event, the cause of the fault is determined as a misalignment of a connector in 1508.

Subsequently, in order to precisely analyze, a light source with a short wavelength (for example, 1310 nm) is applied to the optical link using the OTDR and the OTDR trace is measured from the reflected signal in 1512. Next, intensities of OTDR reflected signals measured with two wavelengths are compared in 1514, and then it is determined whether intensity of the reflected signal with a long wavelength is greater than that of the reflected signal with a short wavelength in 1516. Based on the determination result, when intensity of the reflected signal with a long wavelength is greater than that of the reflected signal with a short wavelength, the cause of the fault is determined as a bending in 1518, or when intensity of the is reflected signal with a short wavelength is greater than that of the reflected signal with a long wavelength, the cause of the fault is determined as a splicing fault in 1520. After the cause of the fault is identified, a fault alarm or warning message may be output in 1522.

While the present invention has been particularly described with reference to exemplary embodiments, it will be understood by those of skilled in art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims and will be construed as being included in the present invention.

According to the embodiment, it is possible to precisely identify a position and a type of the fault when a fault or performance degradation in optical fibers occurs. In particular, it is possible to more closely analyze faults and more precisely diagnose faults than conventional OTDR trace-based OTDR devices. Therefore, as accuracy performance of the optical link fault monitoring device increases, efficiency of network management can increase, and costs for fault diagnosis and recovery can decrease. Furthermore, since it is possible to implement using conventional, widely available technologies, compatibility with conventional devices and cost competitiveness increase.

The present invention can be implemented as computer-readable codes in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of monitoring a fault of an optical link in an optical fiber, comprising:
    applying an optical link fault monitoring signal to the optical link, measuring optical intensity of a reflected signal returning from the optical link, and obtaining a trace;
    determining a number of waveforms of the reflected signal;
    determining a default number of waveforms of a default reflected signal, which is the reflected signal when the optical link is fault-free; and
    identifying a type of the fault using the obtained trace and the number of waveforms of the reflected signal, including determining that the type of the fault is
        a misalignment of a connector upon detecting that the number of waveforms of the reflected signal is greater than the default number,
        a bending fault of the optical fiber upon detecting that the number of waveforms of the reflected signal is less than the default number, and
        a splicing fault of the optical fiber upon detecting that the number of waveforms of the reflected signal is equal to the default number.

2. The method according to claim 1, wherein the identifying of the type of the fault further includes:
    checking a fault event on the obtained trace; and checking a presence of a spike at a position where the fault event is checked on the trace to determine as a reflective event when the spike is present, or otherwise as a non-reflective event.

3. The method according to claim 2, wherein the identifying of the type of fault further includes determining that the type of the fault is the bending fault based on a change of a refractive index distribution of the optical fiber using a conformal transformation when the fault event is determined as the non-reflective event.

4. The method according to claim 1, further comprising reporting a result of the identifying the type of the fault to an external system.

5. A method of monitoring a fault of an optical link in an optical fiber, comprising:
applying optical link fault monitoring signals having different first and second wavelengths to the optical link;
identifying a type of the fault by
measuring optical intensities of reflected signals returning from the optical link,
comparing the optical intensities of reflected signals, and
determining that the fault is
a bending fault of the optical fiber upon detecting that the optical intensity of the reflected signal with the first wavelength is greater than that of the reflected signal with the second wavelength, and
a splicing fault of the optical fiber upon detecting that the optical intensity of the reflected signal with the second wavelength is greater than that of the reflected signal with the first wavelength.

6. The method according to claim 5, wherein the identifying of the type of the fault further includes:
obtaining a trace through the optical link fault monitoring signal having the first wavelength to check a fault event;
checking whether a spike is present at a position where the fault event is checked on the trace to determine as a reflective event when the spike is present, or otherwise as a non-reflective event
wherein the first wavelength is longer than the second wavelength.

7. The method according to claim 6, wherein the identifying of the type of the fault further includes determining that the fault is a misalignment of a connector when the fault event is determined as the reflective event.

8. The method according to claim 5, further comprising reporting a result of identifying a type of the fault to an external system.

9. A device for monitoring a fault of an optical link in an optical fiber, comprising:
an optical signal generating unit configured to generate an optical link fault monitoring signal and apply the monitoring signal to the optical link;
a reflected signal intensity measuring unit configured to measure optical intensity of an reflected signal returning from the optical link and obtain a trace;
a reflected signal waveform measuring unit configured to measure waveforms of the reflected signal; and
a fault determining unit configured to identify a type of the fault using the trace obtained by the reflected signal intensity measuring unit and the waveforms measured by the reflected signal waveform measuring unit, the fault determining unit being configured to determine that the type of the fault is
a misalignment of a connector upon detecting that a number of the waveforms of the reflected signal is greater than a default number of waveforms of a default reflected signal, which is the reflected signal when the optical link is fault-free,
a bending fault of the optical fiber upon detecting that the number of waveforms of the reflected signal is less than the default number, and
a splicing fault of the optical fiber upon detecting that the number of waveforms of the reflected signal is equal to the default number.

10. The device according to claim 9, wherein the fault determining unit checks a fault event on the trace obtained by the reflected signal intensity measuring unit and checks whether a spike is present at a position where the fault event is checked on the trace to determine as a reflective event when the spike is present, or otherwise as a non-reflective event.

11. The device according to claim 9, wherein the optical signal generating unit applies a first monitoring signal having a first wavelength and a second monitoring signal having a second wavelength to the optical link, the first wavelength being longer than the second wavelength, and
the fault determining unit identifies the type of the fault using the trace obtained by the reflected signal intensity measuring unit and a wavelength dependence of reflected signal intensities, measured by the reflected signal waveform measuring unit, of the first and second monitoring signals.

12. The device according to claim 11, wherein the fault determining unit determines that the fault is the bending fault of the optical fiber when the intensity of the reflected signal with the first wavelength is greater than that of the reflected signal with the second wavelength, or the splicing fault when the intensity of the reflected signal with the second wavelength is greater than that of the reflected signal with the first wavelength.

13. The device according to claim 11, wherein the fault determining unit checks a fault event on the trace of the reflected signal with the first or second wavelength to determine as a reflective event when the spike is present at a position where the fault event is checked, or otherwise as a non-reflective event.

* * * * *